US007504751B2

(12) United States Patent
Kraus et al.

(10) Patent No.: US 7,504,751 B2
(45) Date of Patent: Mar. 17, 2009

(54) SMALL ELECTRIC APPLIANCE WITH A DRIVE MECHANISM FOR GENERATING AN OSCILLATORY MOTION

(75) Inventors: Bernhard Kraus, Braunfels (DE); Alexander Klos, Kriftel (DE)

(73) Assignee: Braun GmbH, Kronberg (DE)

( * ) Notice: Subject to any disclaimer, the term of this patent is extended or adjusted under 35 U.S.C. 154(b) by 222 days.

(21) Appl. No.: 11/078,096

(22) Filed: Mar. 11, 2005

(65) Prior Publication Data

US 2005/0212633 A1 Sep. 29, 2005

Related U.S. Application Data

(63) Continuation of application No. PCT/EP03/09152, filed on Aug. 19, 2003.

(30) Foreign Application Priority Data

Sep. 11, 2002 (DE) ................................ 102 42 091

(51) Int. Cl.
*H02K 41/00* (2006.01)

(52) U.S. Cl. ........................................... 310/12; 310/13

(58) Field of Classification Search ................... 310/12, 310/217, 254, 15, 14, 13; 318/135, 37, 432; 30/34, 43, 92
See application file for complete search history.

(56) References Cited

U.S. PATENT DOCUMENTS 3,296,468 A 1/1967 Townshend
6,559,563 B1 * 5/2003 Shimizu et al. ............... 310/12
7,015,602 B2 * 3/2006 Kraus et al. .................. 310/36
7,065,877 B2 * 6/2006 Stevens ...................... 30/34.2
7,180,254 B2 * 2/2007 Klemm et al. ............. 318/135
2002/0047325 A1 * 4/2002 Hente ......................... 310/36

FOREIGN PATENT DOCUMENTS

| | | |
|---|---|---|
| DE | 265598 | 12/1949 |
| DE | 1 463 988 | 7/1969 |
| DE | 1463988 | * 7/1969 |
| EP | 1 162 721 | 12/2001 |
| EP | 1 193 844 | 3/2004 |
| FR | 2 212 673 | 7/1974 |

* cited by examiner

*Primary Examiner*—Dang D Le
*Assistant Examiner*—Iraj A Mohandesi
(74) *Attorney, Agent, or Firm*—Fish & Richardson P.C.

(57) ABSTRACT

A small electric appliance with a drive mechanism for generating an oscillatory motion of at least one working unit of the small electric appliance. The drive mechanism has a first drive component, a second drive component, and a coil for producing a magnetic field that extends from the first drive component and acts on the second drive component that is movably arranged in the small electric appliance, in such a way that the second drive component is set in an oscillatory motion. The first drive component is movably arranged in the small electric appliance in order to execute an oscillatory motion in phase opposition to the second drive component, and the drive mechanism is fastened to the small electric appliance by means of at least one first spring element.

16 Claims, 4 Drawing Sheets

SMALL ELECTRIC APPLIANCE WITH A DRIVE MECHANISM FOR GENERATING AN OSCILLATORY MOTION

RELATED APPLICATIONS

This application is a continuation of PCT application number PCT/EP2003/009152, filed Aug. 19, 2003, which claims priority from German application serial no. 102 42 091.2, filed Sep. 11, 2002. The entire contents of the above PCT application are herein incorporated by reference.

TECHNICAL FIELD

This invention relates to a small electric appliance such as an electric shaver or an electric toothbrush, having a drive mechanism for generating an oscillatory motion.

BACKGROUND

Devices have been developed for creating oscillatory motion in phase opposition in dry shaving apparatus. For example, DE 1 151 307 A describes an oscillating armature drive for dry shaving apparatus with reciprocating working motion. The oscillating armature drive includes a U-shaped electromagnet formed fast with the housing of the shaving apparatus. Arranged in the proximity of the poles of the stationary electromagnet are a working armature and on either side of the working armature in mass symmetry a respective oscillatory compensating armature.

In operation, the working armature, which drives the shaving cutter, oscillates parallel to the pole faces of the electromagnet, and the compensating armatures perform an oscillatory motion in phase opposition.

Another example, DE 196 80 506 T1 discloses an electric shaving apparatus having a linear oscillating motor with a stationary electromagnet and several movable components that are set in oscillation in phase opposition to each other by means of the electromagnet. The electromagnet is fixedly screwed to the chassis of the shaving apparatus. The movable components are movably suspended on the chassis by means of a leaf spring. The leaf spring has a plurality of slits to enable the individual movable components to move in relatively opposing directions.

SUMMARY

Various aspects of the invention feature a small electric appliance with a drive mechanism for generating an oscillatory motion of at least one working unit of the small electric appliance. The drive mechanism has a first drive component, a second drive component, and a coil for producing a magnetic field that extends from the first drive component and acts on the second drive component that is movably arranged in the small electric appliance, in such a way that the second drive component is set in an oscillatory motion. The first drive component is movably arranged in the small electric appliance in order to execute an oscillatory motion in phase opposition to the second drive component, and the drive mechanism is fastened to the small electric appliance by means of at least one first spring element.

As the result of the phase opposition in the oscillatory motion of the two drive components, a significantly higher relative speed of the drive components is achieved than with a conventional drive in which only one drive component moves and the other drive component is at rest. As the efficiency of such drives increases with the relative speed of the drive components, it is possible to achieve higher degrees of efficiency with the drive mechanism being disclosed than with comparable drives known in the art. The suspension by means of a spring element is practically friction free. In addition, the spring element largely decouples the remaining parts of the small appliance, in particular the housing, from the drive mechanism in terms of oscillations.

The first drive components and the second drive component may be interconnected by means of at least one second spring element. This enables a largely friction-free relative movement of the two drive components. At the same time the restoring forces required for operating the drive mechanism are also generated. The spring constant of the second spring element is may be greater than the spring constant of the first spring element. This enables, on the one hand, a relatively stiff coupling between the two components and, on the other hand, a relatively slack coupling of the drive mechanism to the housing of the small appliance.

In one embodiment of the small appliance, the first and/or the second spring element is/are constructed as a leaf spring. A leaf spring is elastically yielding in respect of only one spatial direction. In respect of the two other spatial directions it acts like a rigid body and may thus perform additional static functions in these spatial directions. Other advantages of the leaf spring are that its space requirements are extremely low and it is available as a low-cost item.

The first and the second spring element may be constructed as an integral unit. This enables the number of individual parts of the small appliance to be reduced. In particular, the first spring element and the second spring element may be constructed as a common leaf spring in the form of a cross.

The second spring elements may be arranged in stack form one above the other. The advantage of this arrangement is that very high spring constants and hence a very stiff coupling of the two drive components can be realized. To keep friction as low as possible, it is an advantage in this context to provide spacers for maintaining the second spring elements in spaced relation to each other.

Provision may be made for a third spring element to define a position of rest for the drive mechanism.

In a another embodiment, the mass centers of gravity of the first drive component and of the second drive component, including parts co-moving with the first drive component or the second drive component, move on a common straight line. It is thereby possible to prevent the generation of a resulting angular momentum. Furthermore, the drive mechanism is preferably constructed such that the linear momentums of the first drive component and of the second drive component, including parts co-moving with the first drive component or the second drive component, are opposite and equal so that no linear momentum is generated. Such provisions make it possible to dimension the second spring element very weakly and hence to accomplish a nearly complete decoupling of the drive mechanism from the housing of the small appliance.

At least one of the two drive components may have one or more permanent magnets. Furthermore, at least one of the two drive components may have a core around which the coil is wound. With this arrangement it is possible, with relatively small dimensions, to obtain a powerful drive whose power consumption is sufficiently low to permit, for example, a battery-powered operation of the small electric appliance.

Another embodiment is directed to an electric hair cutting appliance. In this embodiment a pair of hair cutting elements includes a set of cutting blades. The hair cutting elements are driven by a drive mechanism. The drive mechanism comprises two drive components. Each of the drive components carries one of the hair cutting elements. A coil is used to produce a magnetic field that extends between the first and second drive components. This magnetic field acts on the second drive component is set in an oscillatory motion. Further, the first drive component executes an oscillatory motion in phase opposition the said second drive component. While both the first and second drive components execute their respective motion an air gap between the two drive components remains essentially constant.

The present invention will be explained in the following with reference to the embodiments illustrated in the accompanying drawings. The embodiments relate in each case to an electric shaver. However, it will be understood that the concepts disclosed herein are also suitable for utilization in connection with other small electric appliances such as an electric toothbrush.

DESCRIPTION OF DRAWINGS

Like reference symbols in the various drawings indicate like elements.

DETAILED DESCRIPTION

Figure 1:
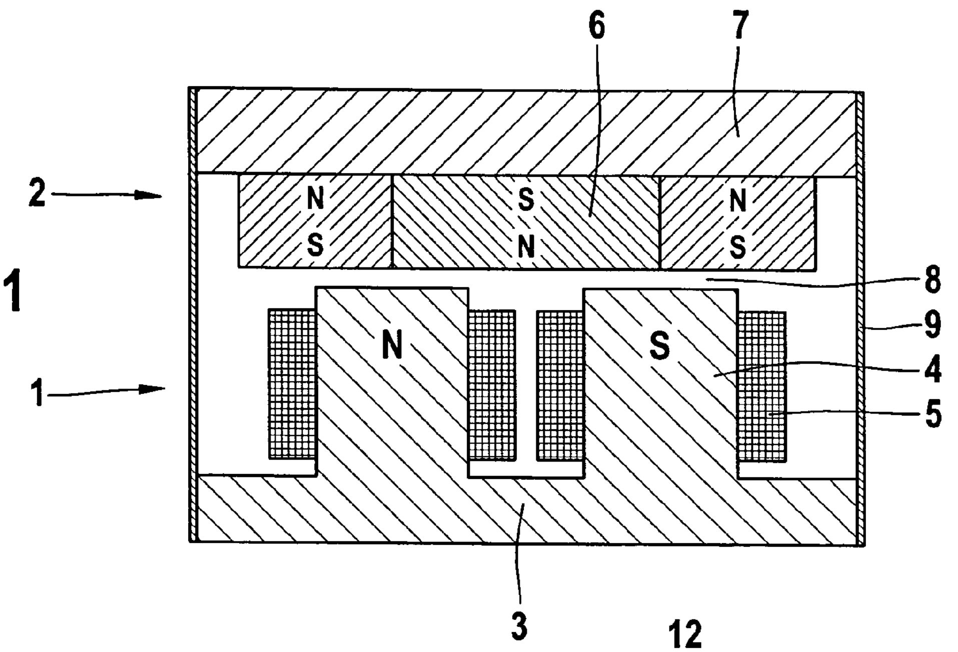
FIG. 1 is a highly schematic sectional view of an embodiment of a drive mechanism of a shaver.

FIG. 1 is a highly schematic sectional view of one embodiment of a drive mechanism of the shaver. The drive mechanism of the shaver is constructed as a linear oscillating motor which has two movable motor components 1 and 2 arranged at a small relative distance. The first motor component 1 is comprised of an iron core 3 having two legs 4 extending in the direction of the second motor component 2. Arranged on each leg 4 is a wire-wound coil 5 which may be operated as separate, individual coils or as one common coil. The second motor component 2 has three permanent magnets 6 that are arranged side by side with antiparallel polarity on a common carrier plate 7 in such manner that one of the magnetic poles points in the direction of the iron core 3 of the first motor component 1. Like the iron core 3, the carrier plate 7 is made from an iron material. The two motor components 1 and 2 are arranged side by side in such close proximity to each other that only a narrow air gap 8 separates the permanent magnets 6 from the ends of the adjacent legs 4 of the iron core 3. The width of the air gap 8 is dictated by two leaf springs 9 secured to the respective sides of the iron core 3 and the carrier plate 7. One property of the leaf springs 9 is that they act like rigid bodies within the plane spread out by them, yielding elastically in a direction perpendicular to this plane. For the embodiment illustrated in FIG. 1, this means that in overcoming the restoring force produced by the leaf springs 9, the two motor components 1 and 2 may move relative to each other to the left and right, yet they will maintain their relative distance and the width of the air gap 8 remains practically unchanged. This results in an oscillatory system in which the first motor component 1 and the second motor component 2 each perform a linear oscillating movement. The directions of movement of the two motor components 1 and 2 are opposed, that is, the oscillations are in phase opposition to one another.

To start and maintain the oscillations, an electric current is caused to flow through the coils 5. The coils 5 act as electromagnets and, assisted by the iron core 3, produce a magnetic field that acts on the permanent magnets 6 and results in a relative movement of the coils 5 and the permanent magnets 6. Through suitable activation it is possible to reverse the polarity of the magnetic field produced with the coils 5, causing the first and the second motor component 1 and 2 to be set in oscillations of opposite phase. In this context, both the first motor component 1 and the second motor component 2 moves, i.e., the linear motor has no stator which is used to drive a rotor, but two counter-oscillating motor components 1 and 2 which drive each other.

One of these motor components 1 or 2 corresponds to the rotor of a conventional linear motor. The other motor component performs the functions of, but it is not static like the stator of a conventional linear motor. Under otherwise identical conditions, this results, in the first and second motor component 1 and 2 of the linear motor moving at a relative speed that is twice as high as the relative speed of a stator and a rotor of a conventional linear motor. Thus, a relatively high degree of efficiency can be achieved. The frequency of the oscillating movements of the two motor components 1 and 2 is predetermined by the activation of the coils 5 and set so that it corresponds to the resonant frequency of the oscillatory system formed by the two motor components 1 and 2 and the leaf springs 9. Under resonant conditions, there results a highly robust oscillatory action, which requires comparatively little energy input.

Figure 2:
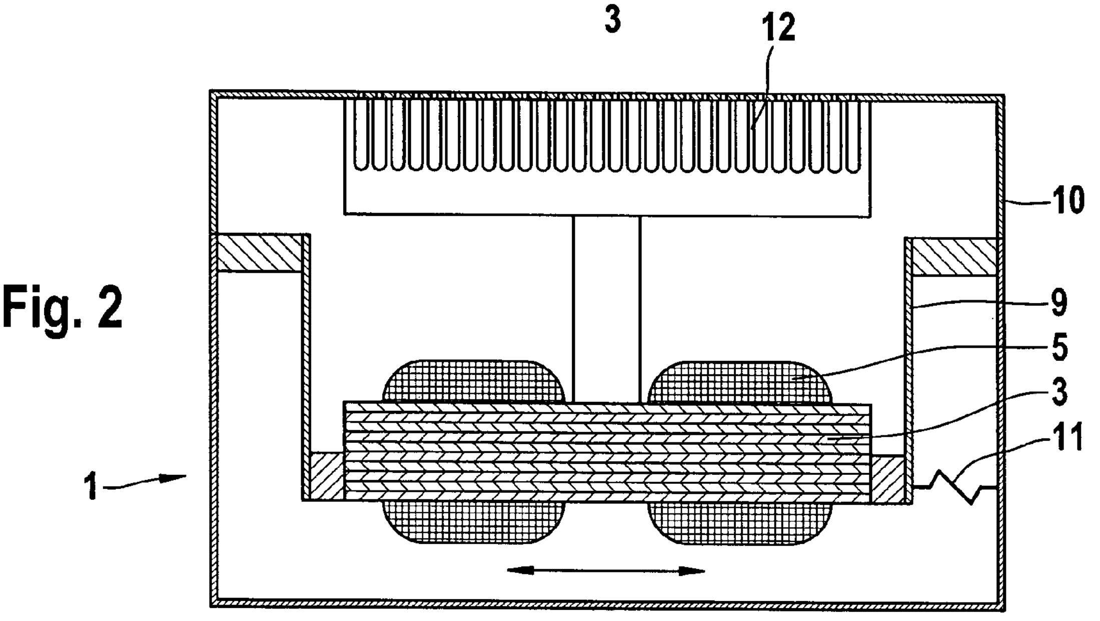
FIG. 2 is a highly schematic partial view of the shaver, showing the embodiment of the linear motor illustrated in FIG. 1.

FIG. 2 is a highly schematic partial view of the shaver, showing the linear motor illustrated in FIG. 1. The view is restricted to the immediate mounting environment of the linear motor in the shaver. Through the leaf springs 9, the linear motor is suspended on a housing 10 of the shaver, that is, the leaf springs 9 not only perform the function of coupling the two motor components 1 and 2 for relative movement, but also suspend the linear motor on the housing 10. Suspending the linear motor by means of the leaf springs 9 is considered an appropriate solution because both motor components 1 and 2 move. This motion precludes a screw connection with the housing 10 or some other rigid fastening of one of the motor components 1 or 2. In addition to largely preventing the occurrence of unwelcome vibrations of the housing 10, the leaf springs 9 enable a friction-free suspension to be accomplished. In order to ensure that the linear motor occupies a defined position of rest in spite of this loose suspension and for stabilization of the leaf springs 9, at least one of the leaf springs 9 is connected with the housing 10 through an additional spring element 11. FIG. 2 also shows a shaving cutter 12 that is fitted to the first motor component 1 or to the second motor component 2. Alternatively, it is also possible to make provision for two shaving cutters 12, the one being fitted to the first motor component 1 and the other to the second motor component 2. The shaving cutter 12 or each of the two shaving cutters 12 is driven in a reciprocating manner by the linear motor.

Figure 3:
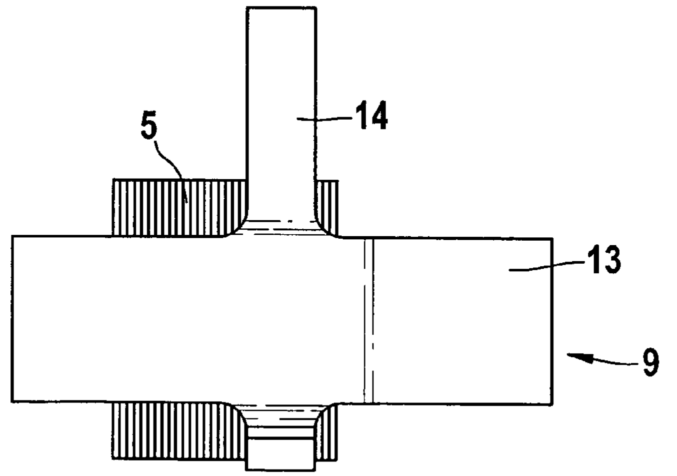
FIG. 3 is a side view of a leaf spring in mounted condition.

FIG. 3 is a side view of the leaf spring 9 in mounted condition. The view is chosen so that the two motor components 1 and 2, which are concealed by the leaf spring 9, oscillate perpendicular to the plane of projection. The leaf spring 9 is cross-shaped, having a relatively broad horizontal beam 13 and, extending from the center thereof, a comparatively narrow vertical beam 14, the two beams being integrally made of one piece. The horizontal beam 13 serves to connect the first and second motor components 1 and 2. The vertical beam 14 serves to suspend the linear motor on the housing 10 of the shaver and has, given its geometry, a substantially smaller spring constant than the horizontal beam 13.

The leaf springs 9 shown in FIG. 3 differs slightly from the leaf springs 9 shown in FIG. 2. In FIG. 2, an additional spring element 11 is integrally formed with the leaf spring 9 in the form of the lower section of the vertical beam 14, that is, the leaf springs 9 of FIG. 2 do not need this lower section, which enables them to be T-shaped instead of cross-shaped. The fastening to the housing 10 takes place at the lower end and at the upper end of the vertical beam 14. Instead of arranging the vertical beam 14 centrally on the horizontal beam 13 and accordingly suspending the horizontal beam 13 centrally, it is also possible to provide two vertical beams 14 which are arranged in the two end regions of the horizontal beam 13 and serve to suspend the horizontal beam 13 on the housing 10 at its respective ends. In this variant the leaf spring 9 is H-shaped instead of cross-shaped. However, when fastening the leaf spring 9 to the housing 10, allowance has to be made for the oscillating movements of the two motor components 1 and 2 being then transmitted to the vertical beams 14 of the leaf spring.

Figure 4:
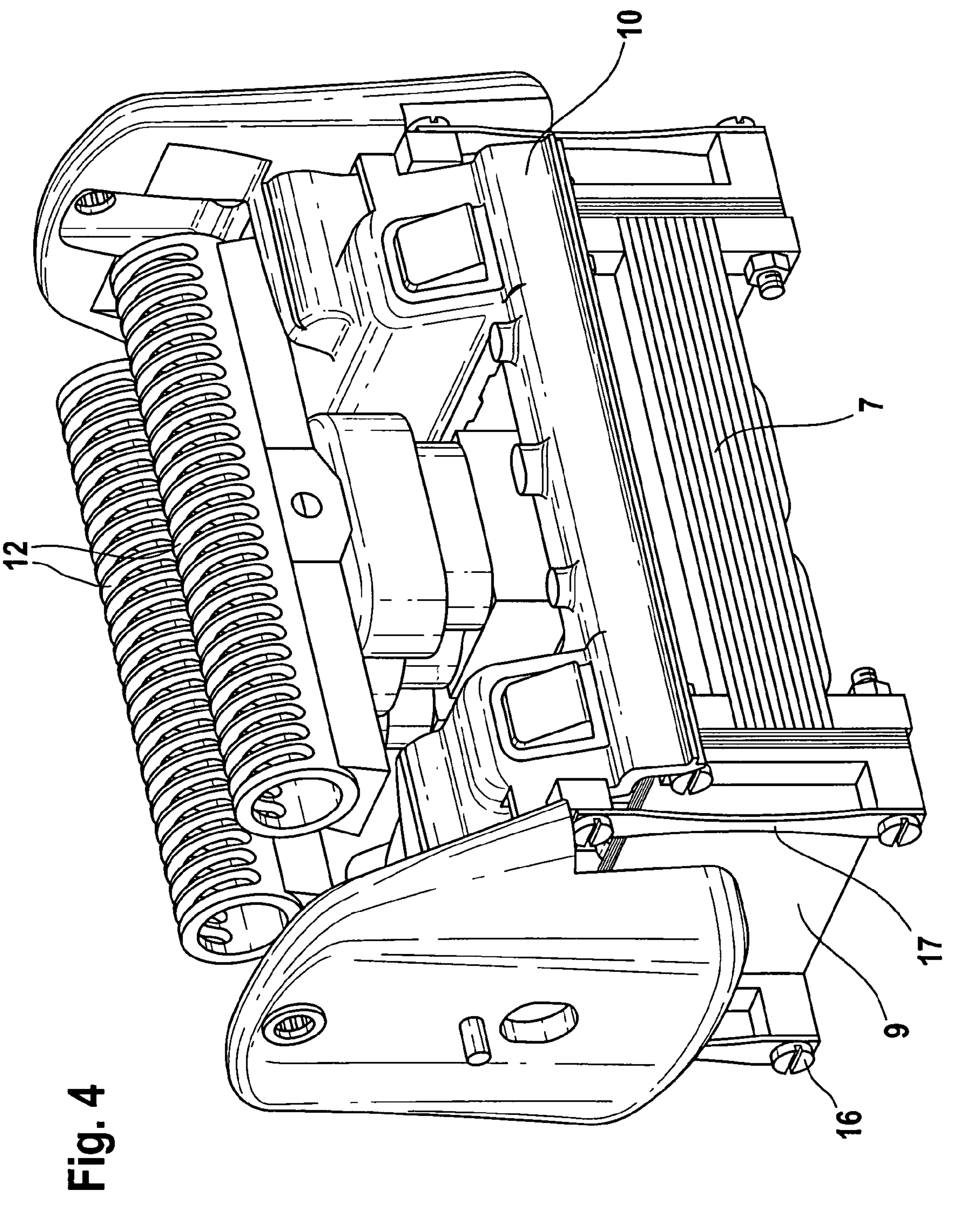
FIG. 4 is a perspective partial view of an embodiment of the shaver, showing a detail corresponding to FIG. 2.
Figure 5:
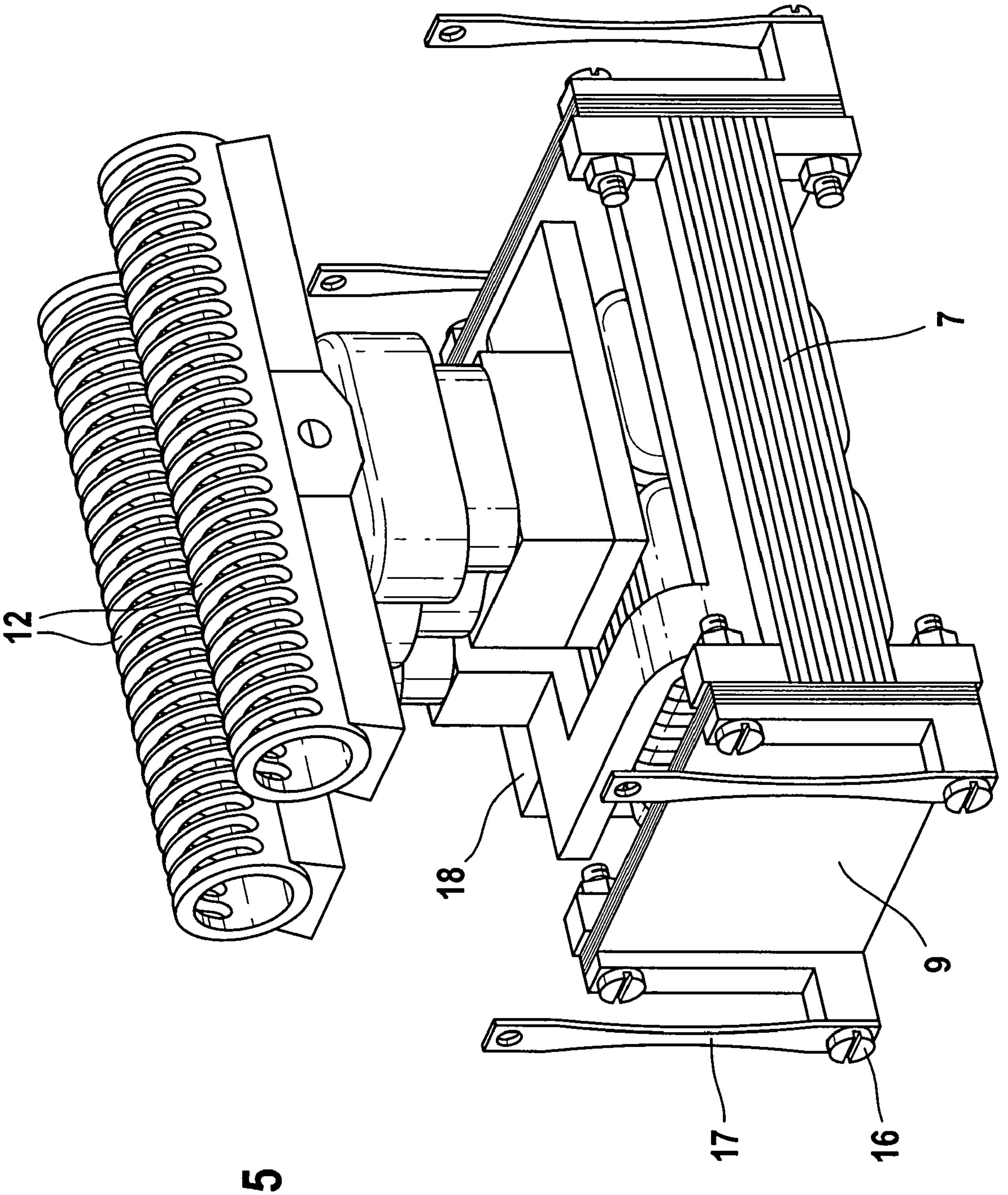
FIG. 5 is a view similar to FIG. 4 but with some covers removed to show more details.
Figure 6:
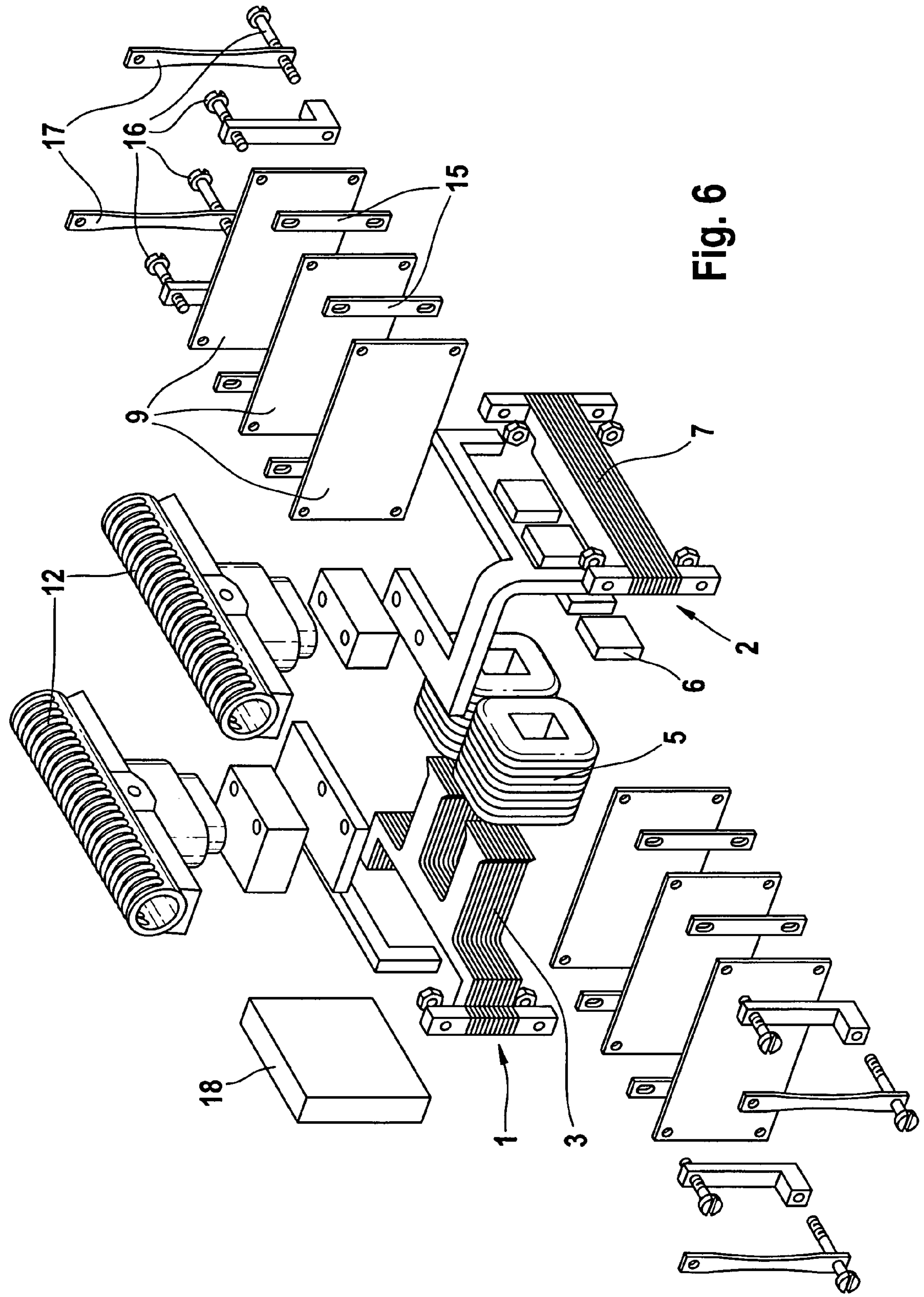
FIG. 6 is an exploded perspective view of FIG. 5.

FIG. 4 shows in a perspective partial view of the shaver in a detail corresponding to FIG. 2. FIG. 5 shows the same representation as FIG. 4, but with a few covers removed to show more details. FIG. 6 is an exploded view of the representation of FIG. 5.

Essentially, the design of the motor components 1 and 2 corresponds to FIG. 1, with the second motor component 2 having however four permanent magnets 6 instead of three permanent magnets 6. Mounted on each motor component 1 and 2 is a shaving cutter 12 so that the two shaving cutters 12 oscillate in phase opposition to each other. The shaving cutters 12 are arranged crosswise on the motor components 1 and 2, so that that the shaving cutter 12 driven by the first motor component 1 is disposed above the second motor component 2, and the shaving cutter 12 driven by the second motor component 2 is disposed above the first motor component 1. Added provision is made for a balance weight 18 on the rotor 7. The purpose of the balance weight 18 is to cause the mass centers of gravity of the first motor component 1 and the second motor component 2, including the co-moving parts such as the shaving cutters 12, to move as far as possible on a common straight line resulting in little or no angular momentum, thereby minimizing unwelcome vibrations caused by angular momentum. Instead of providing a single leaf spring 9, a stack of three rectangular leaf springs 9 is arranged on either side of the linear motor, with spacers 15 being provided to maintain the springs in spaced relation to each other, and screws 16 for holding them together and fastening them to the two motor components 1 and 2. The spacers 15 are to reduce the friction between the individual leaf springs 9 of a stack.

Four separate oscillating bridges 17 are provided to suspend the linear motor on the housing 10. The oscillating bridges 17 are constructed as strips with a tapering section and are generally fabricated from a spring steel, similar to the leaf springs 9.

At one end the oscillating bridges 17 are screwed to one of the motor components 1 or 2 together with the leaf springs 9. At the other end the oscillating bridges 17 are screwed to the housing 10.

In operation, the two motor components 1 and 2, and with them the shaving cutters 12, perform each a linear oscillation in phase opposition to each other. As this occurs, the two stacks of leaf springs 9 are subjected to continuous elastic bending, causing their narrow sides to be deflected in opposite direction, with the direction of the deflection reversing periodically. With the deflection of the narrow sides of the leaf springs 9, the ends of the oscillating bridges 17 fastened thereto are also deflected periodically. When the oscillating bridges 17 are very weakly dimensioned, these deflections are practically not transmitted to the housing 10. In this case, however, the oscillating bridges 17 are also not in a position to absorb an appreciable angular or linear momentum. Therefore, the geometry of the linear motor is to be designed to prevent as far as possible a resulting angular momentum and as far as possible a resulting linear momentum from occurring. This can be accomplished in that the mass center of gravity of the first motor component 1, including all co-moving parts, and the mass center of gravity of the second motor component 2, including all co-moving parts, move along the same straight line. Furthermore, the linear momentums of the first and the second motor components 1 and 2, including the respective co-moving parts, should be opposite and equal.

What is claimed is:

1. An electric hair cutting appliance comprising:

a pair of hair cutting elements, each hair cutting element including a set of cutting blades; and a drive mechanism operably driving the hair cutting elements; the drive mechanism comprising:

a first spring element fastening said drive mechanism to said electric hair cutting appliance;

first and second drive components, each drive component carrying a respective one of the hair cutting elements;

a second spring element interconnecting said first drive component and said second drive component, wherein said second spring element has a greater spring constant than said first spring element; and a coil adapted to produce a magnetic field that extends between the first and second drive components in such a way that said second drive component is set in an oscillatory motion and said first drive component executes an oscillatory motion in phase opposition to said second drive component, while an air gap defined between the first and second drive components is maintained essentially constant.

2. A small electric appliance with a drive mechanism for generating an oscillatory motion, said drive mechanism comprising:

a first spring element fastening said drive mechanism to said small electric appliance;

a first drive component movably arranged in said small electric appliance;

a second drive component movably arranged in said small electric appliance;

a second spring element interconnecting said first drive component and said second drive component, wherein said second spring element has a greater spring constant than the first spring element; and a coil adapted to produce a magnetic field that extends from said first drive component and acts on said second drive component, in such a way that said second drive component is set in an oscillatory motion, wherein said first drive component executes an oscillatory motion in phase opposition to said second drive component, while an air gap defined between the first and second drive components is maintained essentially constant.

3. The small electric appliance of claim 2 wherein at least one of said first and second spring elements is constructed as a leaf spring.

4. The small electric appliance of claim 2 further comprising a third spring element biasing said drive mechanism toward a rest position.

5. The small electric appliance of claim 2 wherein mass centers of gravity of said first drive component and of said second drive component, including parts co-moving with said first drive component and said second drive component, move on a common straight line.

6. The small electric appliance of claim 2 wherein during operation, momentums of said first drive component and of said second drive component, including parts co-moving with said first drive component and said second drive component, are substantially opposite and equal.

7. The small electric appliance of claim 2 wherein at least one of said two drive components has at least one permanent magnet.

8. The small electric appliance of claim 2 wherein at least one of said two drive components has a core around which said coil is wound.

9. The small electric appliance of claim 5 wherein said co-moving components further comprise hair cutters secured to each of the first and second drive components.

10. An electric hair cutting appliance comprising:

a pair of hair cutting elements, each hair cutting element including a set of cutting blades; and a drive mechanism operably driving the hair cutting elements, the drive mechanism comprising:

first and second drive components, each drive component carrying a respective one of the hair cutting elements;

a first spring element fastening said drive mechanism to said electric hair cutting appliance and a second spring element interconnecting said first drive component and said second drive component; and a coil adapted to produce a magnetic field that extends from said first drive component and acts on said second drive component in such a way that said second drive component is set in an oscillatory motion within said appliance and said first drive component executes an oscillatory motion in phase opposition to said second drive component within said appliance, while an air gap defined between associated the first and second drive components is maintained essentially constant.

11. The electric hair cutting appliance of claim 10 wherein said second spring element has a greater spring constant than said first spring element.

12. The electric hair cutting appliance of claim 10 wherein at least one of said first and second spring elements is constructed as a leaf spring.

13. The electric hair cutting appliance of claim 10 wherein said first and second spring elements are constructed as an integral unit.

14. A small electric appliance with a drive mechanism for generating an oscillatory motion, said drive mechanism comprising:

a first spring element fastening said drive mechanism to said small electric appliance;

a first drive component movably arranged in said small electric appliance;

a second drive component movably arranged in said small electric appliance;

a second spring element interconnecting said first drive component and said second drive component, wherein said first and second spring elements are constructed as an integral unit as a leaf spring in cross form; and a coil movably arranged in said small electric appliance, said coil adapted to produce a magnetic field that extends from said first drive component and acts on said second drive component, in such a way that said second drive component is set in an oscillatory motion, wherein said first drive component executes an oscillatory motion in phase opposition to said second drive component, while an air gap defined between the first and second drive components is maintained essentially constant.

15. A small electric appliance with a drive mechanism for generating an oscillatory motion, said drive mechanism comprising:

a first spring element fastening said drive mechanism to said small electric appliance;

a first drive component movably arranged in said small electric appliance;

a second drive component movably arranged in said small electric appliance;

a second spring element interconnecting said first drive component and said second drive component, wherein said second spring element comprises:

a plurality of spring members arranged in stack form and a plurality; and a plurality of spacers between each of said plurality of spring members; and a coil movably arranged in said small electric appliance, said coil adapted to produce a magnetic field that extends from said first drive component and acts on said second drive component, in such a way that said second drive component is set in an oscillatory motion, wherein said first drive component executes an oscillatory motion in phase opposition to said second drive component, while an air gap defined between the first and second drive components is maintained essentially constant.

16. The small electric appliance of claim 6 wherein said co-moving components further comprise hair cutters secured to each of the first and second drive components.

* * * * *